(12) United States Patent
Kühne

(10) Patent No.: US 6,818,175 B1
(45) Date of Patent: Nov. 16, 2004

(54) SYSTEM FOR PRODUCING STEEL

(75) Inventor: Klaus-Jürgen Kühne, Hünxe (DE)

(73) Assignee: SMS Demag AG, Düsseldorf (DE)

( * ) Notice: Subject to any disclaimer, the term of this patent is extended or adjusted under 35 U.S.C. 154(b) by 127 days.

(21) Appl. No.: 10/220,615

(22) PCT Filed: Feb. 24, 2001

(86) PCT No.: PCT/EP01/02105
§ 371 (c)(1),
(2), (4) Date: Aug. 30, 2002

(87) PCT Pub. No.: WO01/64962
PCT Pub. Date: Sep. 7, 2001

(30) Foreign Application Priority Data

Mar. 1, 2000 (DE) .......................................... 100 09 812

(51) Int. Cl.[7] .................................................. C22B 4/08
(52) U.S. Cl. ......................... 266/45; 266/142; 266/236; 266/240; 222/599; 373/73; 373/83; 373/84
(58) Field of Search .......................... 222/599; 266/142, 266/236, 240, 45; 373/73, 83, 84

(56) References Cited

U.S. PATENT DOCUMENTS 2,268,918 A    1/1942   Allan et al.
3,980,801 A *  9/1976   Milasius ...................... 373/84
4,696,013 A *  9/1987   Ehle et al. ..................... 373/71
5,602,867 A *  2/1997   Hubers et al. ................. 373/78
6,269,112 B1 * 7/2001   Poloni et al. ................. 373/78

FOREIGN PATENT DOCUMENTS

| DE | 2921702 | 12/1980 |
| DE | 4006281 | 8/1991 |
| DE | 9304662 | 7/1993 |
| DE | 4445209 | 6/1996 |
| DE | 197 28 102 A1 | 1/1999 |
| EP | 0732411 | 9/1996 |
| WO | 9718050 | 5/1997 |

* cited by examiner

Primary Examiner—Melvyn Andrews
(74) Attorney, Agent, or Firm—Friedrich Kueffner

(57) ABSTRACT

The invention relates to a device for producing steel. The invention device comprises a container (1, 101, 201). The metal used is molten, blown and refined in said container which comprises an upper component (5, 205) having at least one opening, a lower component (2, 202) and means for tapping the melt and slag from the container. Electrodes (21) can be charged into the container through said opening. The aim of the invention is to improve said device in such a way that said device can be constructed in a more simple manner in comparison with known devices. A bottom tapping system is provided for tapping the melt and optionally the slag.

11 Claims, 7 Drawing Sheets

Arc Furnace Operation

Converter Operation

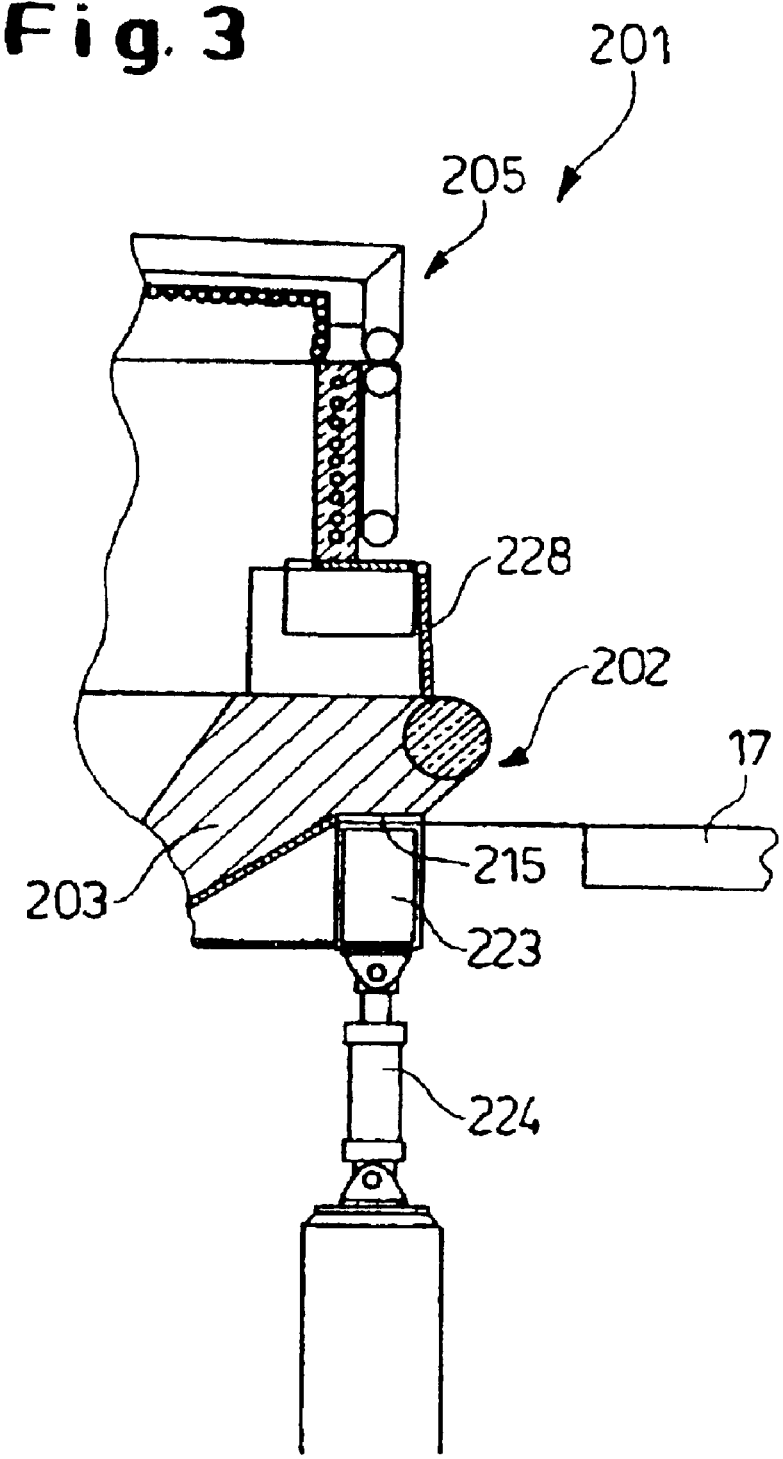

SYSTEM FOR PRODUCING STEEL

The invention concerns a system for producing steel, which comprises a vessel, in which the metallic charge is melted, oxidized, and refined, with an upper vessel section with at least one opening, through which at least one electrode can be lowered into the vessel, and with a lower vessel section with a vessel bottom, and means for tapping the melt and slag from the vessel.

In the production of steels, especially high-grade steels, such as chromium-containing, stainless, acid-resistant, and heat-resistant steels, the charge is usually melted in an electric arc furnace and then oxidized in a separate converter. In a system of this type, the arc furnace serves as the premelting unit, and the actual process of oxidizing and refining to produce the desired grade of steel is carried out in the converter.

DE 197 28 102 A1 describes a system for carrying out both of these processes, i.e., melting and oxidizing, in a single vessel. A vessel suitable for this purpose has a bulging middle and lower section, which is mounted on a tiltable trunnion ring, as is customary in previously known converter systems. Melt and slag are tapped into the steel pouring ladle, which is located at ground level, by tilting the vessel about the center axis and by means of tapping connections or tapholes.

A trunnion ring of this type, its mounting, and the necessary equipment for tilting the vessel by means of the trunnion ring are expensive to design and install and require extensive drive and control equipment. In addition, a vessel of this type with a trunnion ring requires a secure foundation or a secure furnace platform, whose construction consumes a great deal of space and energy.

Proceeding from this general state of the art, the goal of the invention is to develop a generic system which retains the combined melting and oxidizing functions of the system and at the same time simplifies its structural design.

This goal is achieved by the system with the features specified in claim 1. Advantageous modifications are disclosed in the subclaims.

In accordance with the invention, it is proposed that, instead of the previously known tapping system, in which the vessel, which is equipped with tapping connections and is held by a trunnion ring and tilted about its axis to tap slag and melt, a bottom tapping system be provided for tapping the melt and possibly the slag into a collecting vessel located below the vessel in the untilted normal position of the vessel.

At the same time, since it is not desirable to completely abandon the tilting motion, which is useful, especially as a rocking or tilting motion of the molten bath at small tilting angles around the normal position, preferably less than ±5°, at the end of the melting operation, it is proposed that the system be designed with a tilting system with a single-piece or multiple-piece tilting frame, which is located at the level of the bottom of the vessel and on which the vessel can be set by lowering the bottom of the vessel into it.

The tilting system is provided with a tilting element, which acts on the frame on one side, preferably by a lifting motion, in such a way that the frame and thus the vessel are shifted into a tilting motion. The tilting system is also provided with a bearing element, which is located opposite the tilting element, for absorbing the tilting motion of the vessel. The bearing element has either a single-piece design or a multiple-piece design.

All together, due to the proposed bottom tapping system, it is possible to eliminate the conventional, expensive, tilting equipment with a trunnion ring, which comprises the bulging middle section of the melting and oxidizing vessel, and the corresponding drive and control equipment that it requires. This makes it possible to achieve a vessel with an overall structurally simplified design and thus lower installation expense. Due to the elimination of the trunnion ring, the requirements and thus the costs for the furnace platform or the foundation are reduced. However, the possibility of tilting the vessel is still made available by simple mechanical means (preferably with a tilting frame operated with one or more hydraulic tilting cylinders). However, as an alternative to this solution involving the use of a tilting frame, it is also perfectly conceivable for the vessel to be moved horizontally a short distance along a track by means of hydraulic cylinders to produce the tilting motion.

In order to ensure position control of the vessel both in the first embodiment of the vessel with a bottom tapping system, but without a tilting system, and in the second embodiment of the vessel with a tilting system, the lower section of the vessel has laterally displaced or reinforced wall regions above the bottom of the vessel to form stable bearing surfaces, which either rest on bearing supports mounted along the circumference of the vessel or rest directly on the tilting frame. The bearing supports are mounted either directly on the furnace platform or the foundation or on the tilting frame.

The system described, for example, in WO 97/18,050 could possibly apply to the proposed bottom tapping system. However, the object of the invention is not limited to a bottom tapping system of this type, but rather all types of known bottom tapping systems are conceivable. In accordance with the invention, bottom tapping systems are proposed, whose tap openings may be arranged either centrically or eccentrically to the vertical center axis of the vessel.

Basically, it is possible to tap both the melt and the slag successively in a casting after the oxidizing operation by means of the proposed bottom tapping system in the untilted normal position of the vessel of ±0°. In addition, a slag-tapping system with a movable slag gate in the side wall of the vessel is proposed, in which the slag is tapped by moving the vessel by means of the tilting system out of the normal position of ±0° and into a slag-removal position of preferably up to −5°.

The vessel is located on a furnace platform in the form of a steel structure, on a foundation or preferably on the tilting frame, either permanently or as an interchangeable vessel, so that shut-down time due to relining, maintenance work, or repairs can be reduced by replacing the vessel with another vessel.

All together then, there are embodiments of a stationary or tiltable vessel system that is permanently installed and embodiments of a stationary or tiltable vessel system that allows vessel change.

During the melting process, the vessel is provided with a furnace roof, which is preferably water-cooled. The opening in the furnace roof for holding the electrodes can be variously designed, depending on whether the heating equipment for inserting the electrodes is rigidly installed on the furnace platform or foundation or is installed on the tilting frame of the tilting system and thus also participates in the tilting or rocking motion. In the first type of embodiment, the opening must be enlarged relative to the circumference of the electrodes, which are held by an electrode jib arm and are inserted from above into the opening in the vessel by means of a swivelling device of the heating equipment. This enlargement is necessary to ensure that the electrodes do not strike the wall of the opening when the vessel is tilted. If the heating equipment and thus the equipment that supports the electrodes participates in the motion, the electrode openings can be made suitably smaller.

However, still another important advantage is gained by providing the vessel with a roof or hood that can be swung out of the way or, alternatively, with a roof or hood that can be moved horizontally after it has been lifted slightly. Compared to the vessel described in DE 197 28 102 A1, the distance the electrodes must be raised is much smaller, because the electrodes are moved out with the converter hood swung out or moved aside. Since the electrodes must be swung out or moved aside only over the edge of the vessel, the distance the electrodes must be raised is much smaller than in the case of the previously known vessel, in which the electrodes must be raised above the cylindrical section of the vessel, which is lengthened due to the deslagging operation.

Finally, a twin-furnace system is proposed, which has two of the vessels or systems proposed in accordance with the invention, in each of which either the melting phase or converter phase is occurring at any given time. Different roof systems are used in these different phases. In the melting phase, a largely water-cooled furnace roof in tubular construction is preferably used, i.e., pipelines arranged parallel to one another, through which cooling water flows (in-pipe-to-pipe or pipe-gap-pipe design), whereas in the converter phase, a hood that consists of water-cooled refractory concrete is suitable.

Additional advantages and features of the invention are described below with reference to the specific embodiments shown in the attached drawings.

FIG. 3 shows a cross section of a third embodiment of the proposed system with reinforced vessel bottom and tilting system.

Figure 1A:
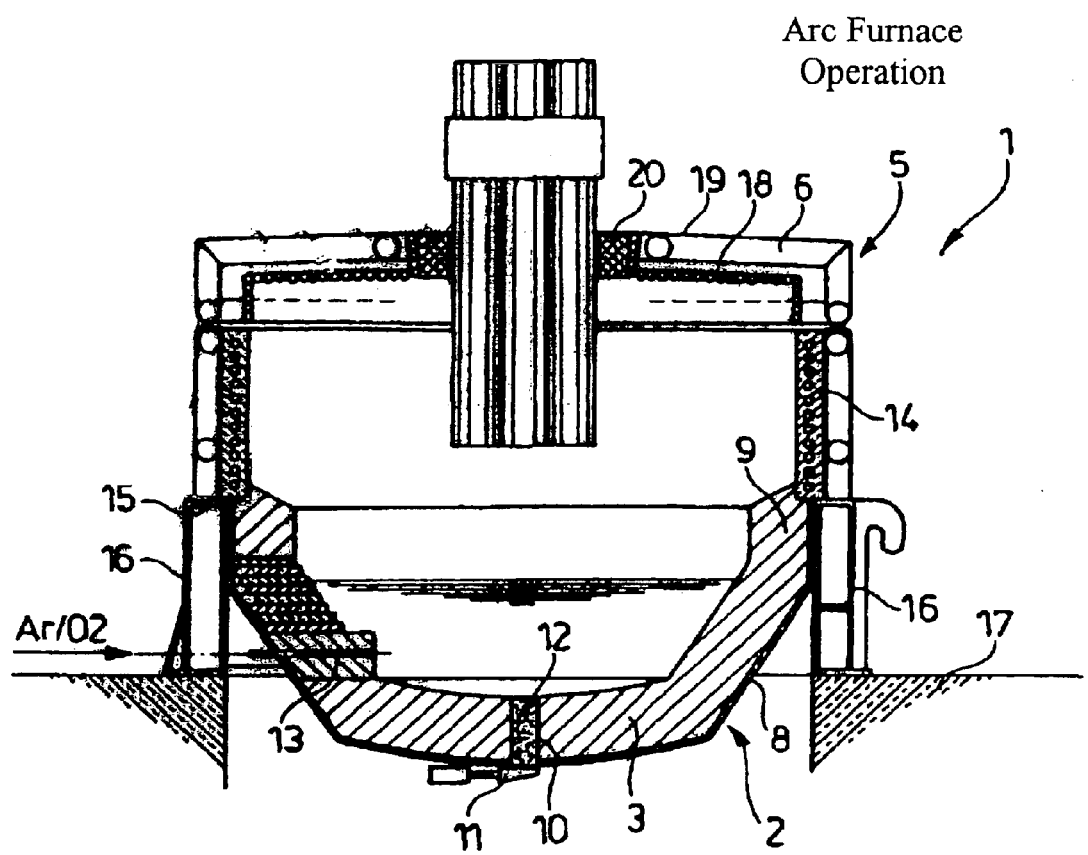
FIG. 1a shows a cross section of a first embodiment of the proposed system for arc furnace operation.

FIG. 1 shows a cross section of a vessel 1 for producing steel, in which both the melting phase (arc furnace operation) and the converter phase (converter operation) are carried out in succession. The vessel 1 consists of a lower vessel section 2 with a vessel bottom 3 and a side wall 4 that extends upward from it. A furnace roof 6 that can be swung out or moved aside is provided as the upper vessel section 5 for the melting phase, while a converter hood 7 that can be swung out or moved aside is provided for the converter phase, as is indicated here by a partial drawing on the left side. The lower vessel section 2 is formed by a metal jacket that is lined with refractory material 9. A taphole 10 for the bottom tapping possibility is centrally located along the center axis of the vessel. The taphole 10 passes through the refractory material 9 and is closed from the outside by a horizontally movable slide gate 11. A gate that can be swung out is also conceivable. During the melting or converter operation, the taphole 10 is filled with a filler material 12, for example, filler sand or granulated material. When the melt is to be tapped, after the slide gate 11 has been moved aside; the filler flows down into the steel pouring ladle (not shown). The upper layer of sintered granulated material is melted by the hydrostatic pressure of the molten metal above it; the molten steel pours down into the steel pouring ladle located below the vessel. In individual cases, it may also happen that the sintered granulated material is burned away from below with an angled oxygen lance to allow bottom tapping to be carried out.

Figure 1B:
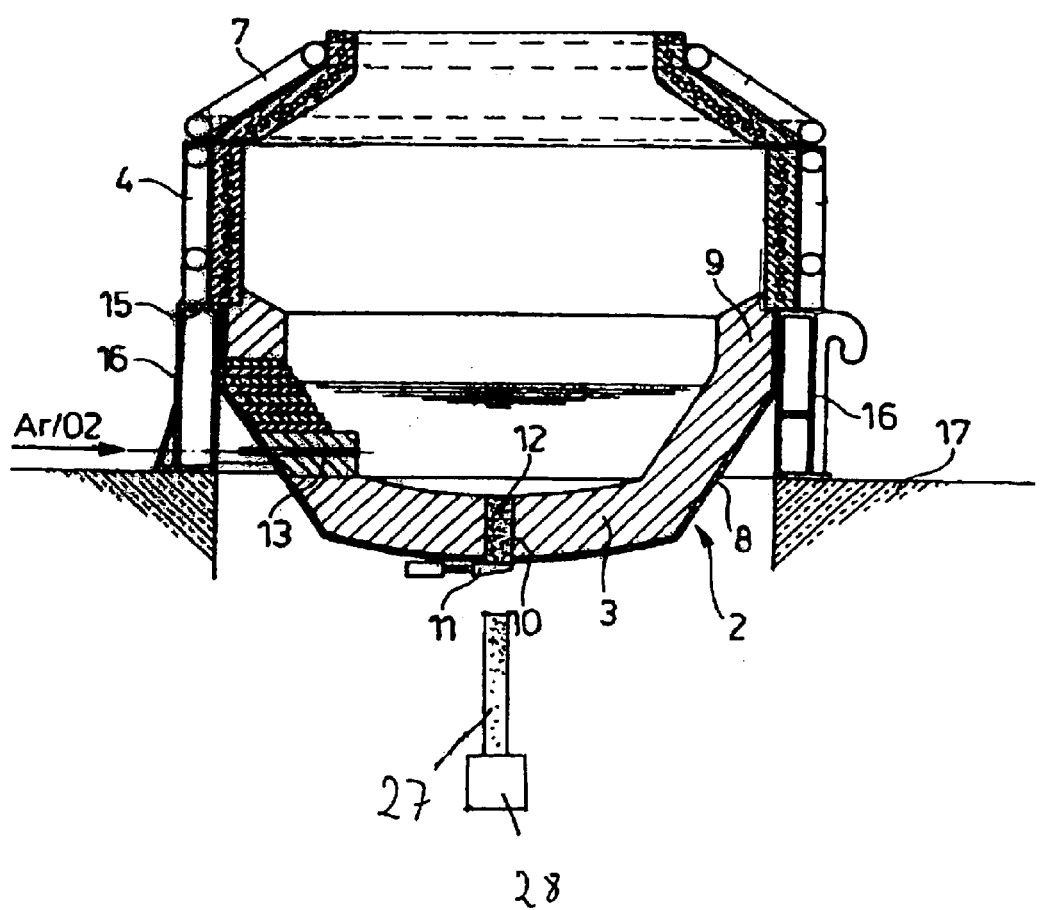
FIG. 1b shows a cross section of a first embodiment of the proposed system for converter operation.

FIG. 1b shows a filling arrangement for filling the taphole 10. A pipe-shaped arrangement 27 is positioned below the taphole 10, and contains the filler material 12. The filler material 12 is brought into the taphole 10 by a screw, a cylinder or similar component 28. If the taphole 10 is filled, the closing element is pushed to the side and prohibits the filler material from flowing out toward the bottom.

Furthermore, bottom tuyeres 13 (one bottom tuyere is shown here as an example) are provided in the lower vessel section 2 for the injection of process gases into the heat, such as argon or oxygen for blowing.

Towards the inside of the vessel, the side walls 4 of the lower vessel section 2 consist of walls 14 through which water flows. In the first embodiment without a tilting system, the side wall 4 is displaced relative to the vessel bottom 3 in such a way that projecting bearing surfaces 15 are formed, which are supported on bearing supports 16 for positioning the vessel 1. Bearing supports 16 of this type are installed all around the vessel on the furnace platform 17.

In the embodiment shown in FIG. 1, the molten steel is tapped into a ladle (not shown) below the vessel with the vessel 1 in the 0° normal position. The ladle may then be sent to a vacuum degassing system.

The vessel 1 is provided with furnace roof 6 for the melting phase or arc furnace operation. In addition to the one-piece or multiple-piece, water-cooled roof panel 18 and the roof panel support frame 19, the furnace roof 6 has a core piece 20 composed of refractory material, through which the electrodes 21 can be inserted by the conveyance system of the heating equipment. The only part of this heating equipment shown in FIG. 1 is the electrode jib arm 22. Electrode operation melts down the burden previously charged to the furnace (scrap, liquid pig iron, pieces of ferroalloys, DRI/HBI, fluxes, etc.) by means of the electric arc that is produced. When the melting phase has been completed, the converter phase begins. In the present case, this is defined as both alloying and blowing with oxygen to lower the carbon concentration of the melt (here through the bottom tuyeres 13). Alloying is carried out by addition of fluxes and alloying additions. For the converter phase, first the furnace cover 6 and then the electrodes 21 are lifted and swung out horizontally. The converter hood or the conical converter top 7 is then swung in or horizontally moved over the vessel 1. Like the vessel wall 4, the converter hood 7 has refractory panels of walls 14 through which cooling water flows. It is designed in such a way that the waste gases that form can be conveyed to suitable offtakes (cf. FIG. 3) and then further conveyed to dust separators.

Figure 2A:
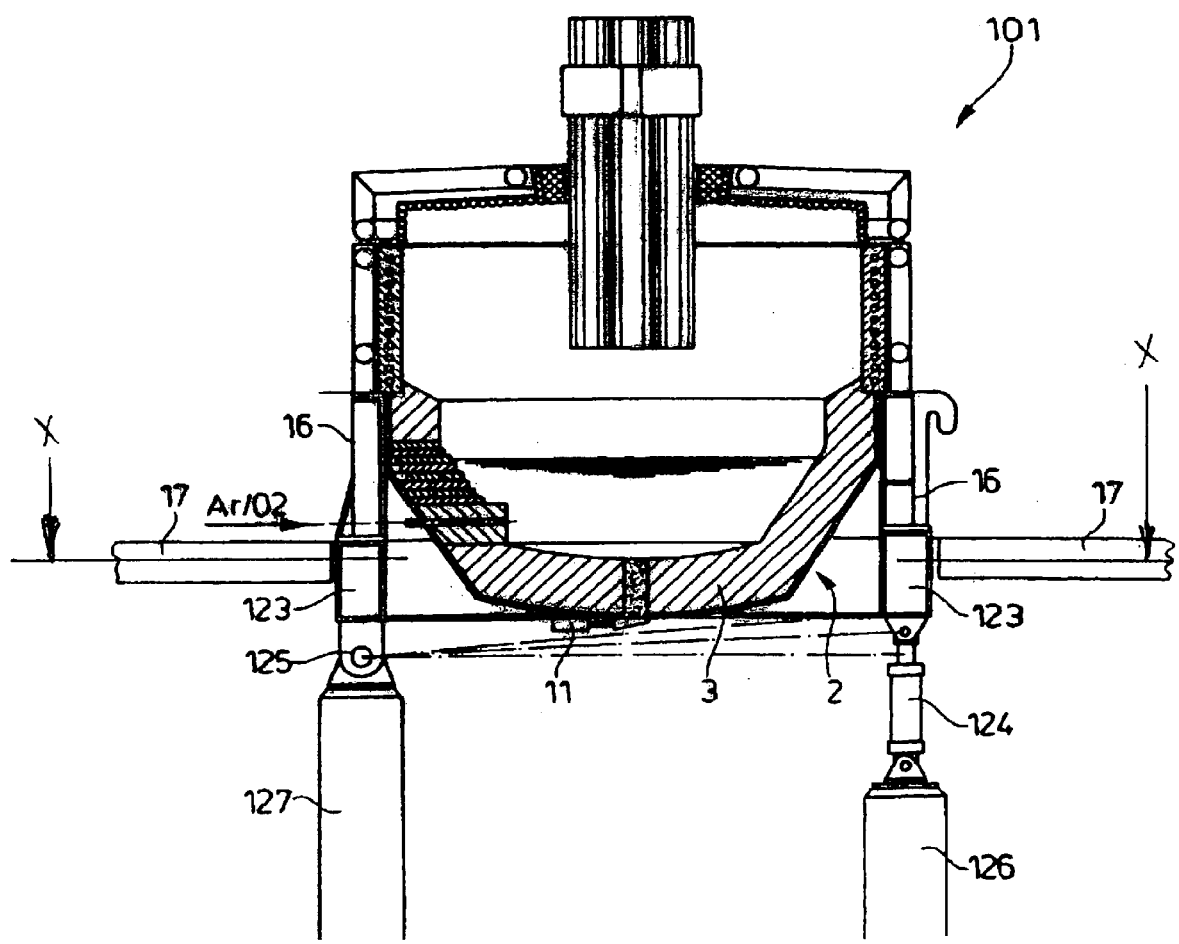
FIG. 2a shows a cross section of a second embodiment of the proposed system with a tilting system for arc furnace operation.
Figure 2B:
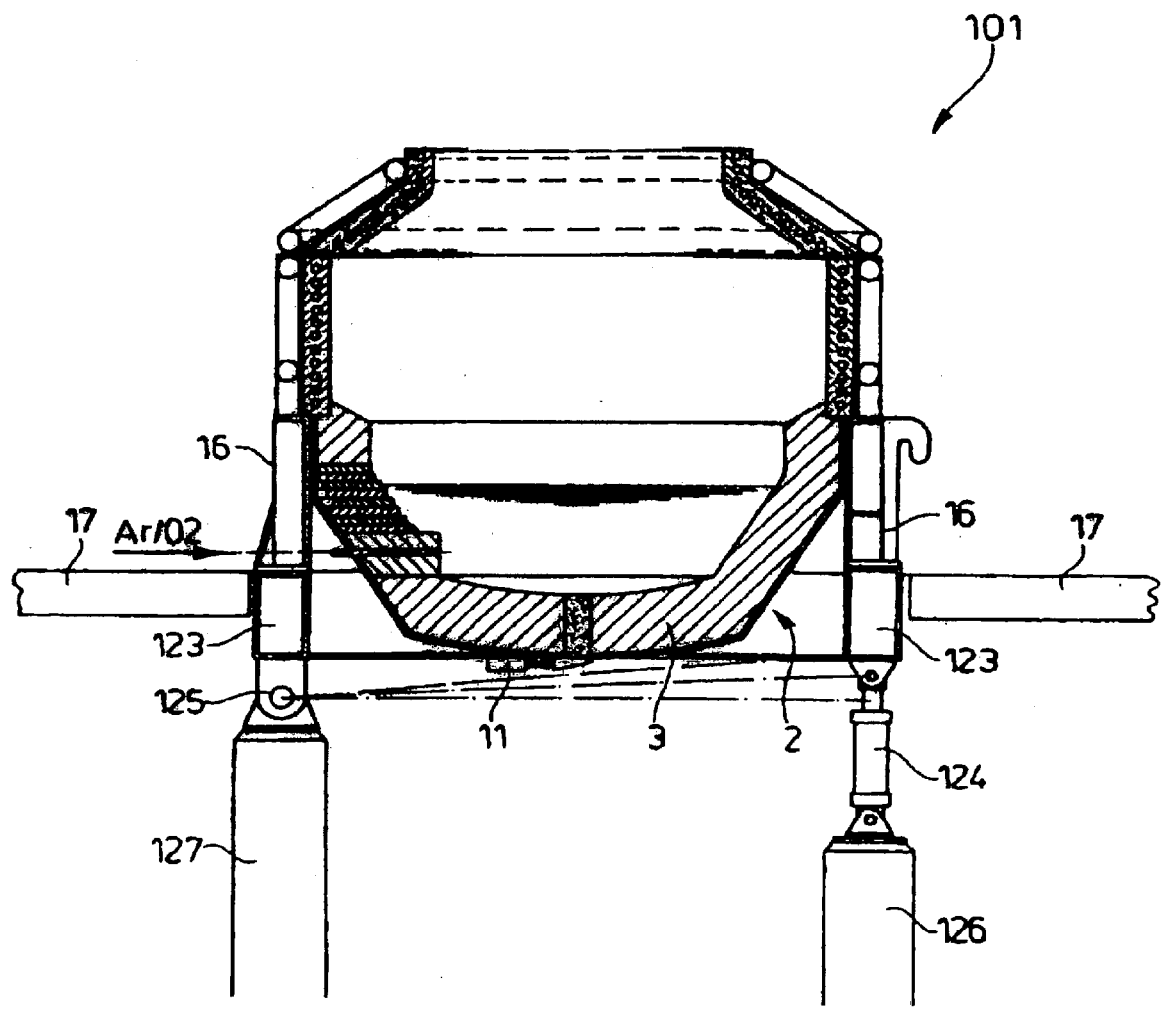
FIG. 2b shows a cross section of a second embodiment of the proposed system with a tilting system for converter operation.

In accordance with a second embodiment of the system of the invention (FIG. 2), the vessel 101 has a tilting frame 123. Since the vessel in FIG. 2 is the same as the vessel in FIG. 1, corresponding parts are labeled with the same reference numbers. In contrast to the embodiment shown in FIG. 1, the bearing supports 16 are not mounted on the furnace platform, but rather on the tilting frame 123. The tilting frame 123 extends around the vessel bottom 3.

The tilting frame 123 is moved vertically by one or more hydraulically operated lifting cylinders 124 installed below the tilting frame 123. Electric motor drives for the tilting frame are also conceivable. The vessel 101 is moved in this way from its normal position into a position that is tilted at small angles of preferably ±5° (the tilted position is not shown). To absorb the tilting motion, the tilting frame is mounted on a swivel bearing 125 on the side opposite the lifting cylinder 124. Tilting angles are drawn in with dot-dash lines. This makes it possible to move the vessel 101 into the above-described inclined position of ±5°. This significantly reduces the installation and operating expense compared to the previously known vessel with a support frame. The lifting cylinder or cylinders 124 and the bearing members 125 are mounted on additional supports 126, 127 to create a free space below the vessel 101 and the furnace platform for tapping the heat into a steel pouring ladle.

In a third embodiment of the vessel 201, the tilting motion produced by the tilting frame 223 is used not only to produce a tilting or rocking motion, but also to remove slag through the slag-tapping gate 228, especially in the production of carbon steels. To this end, the vessel bottom 203 of the lower vessel section 202 with the refractory material 209 is designed with lateral reinforcement to form several stable bearing surfaces 215 for supporting the vessel on the tilting frame 223. The upper vessel section 205 shows no significant changes from the vessel shown in FIGS. 1 and 2.

Figure 5A:
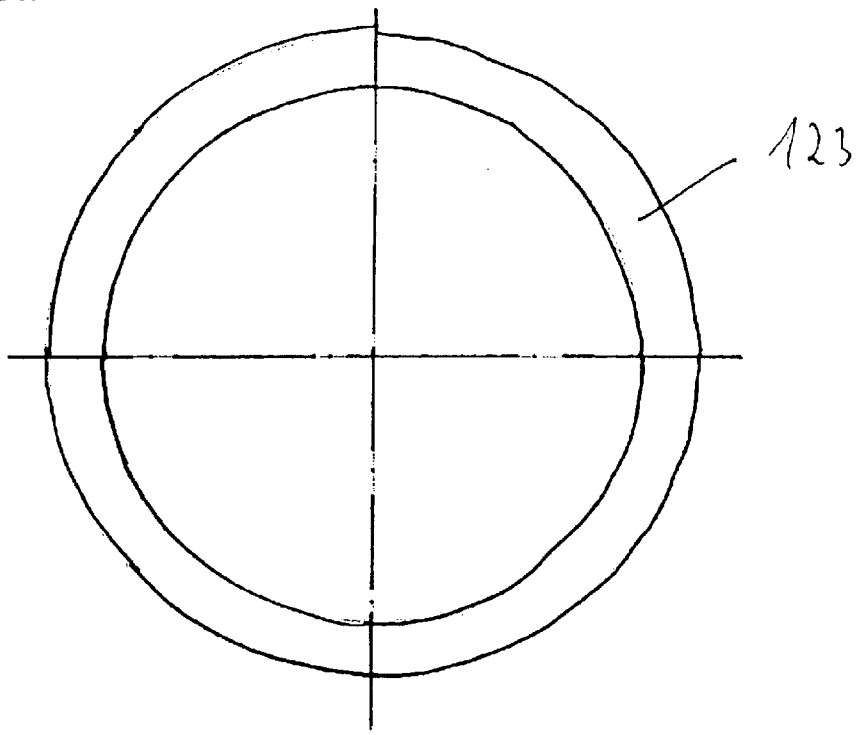
FIG. 5a shows a section along the line X—X in FIG. 2a of a one piece tilting frame.
Figure 5B:
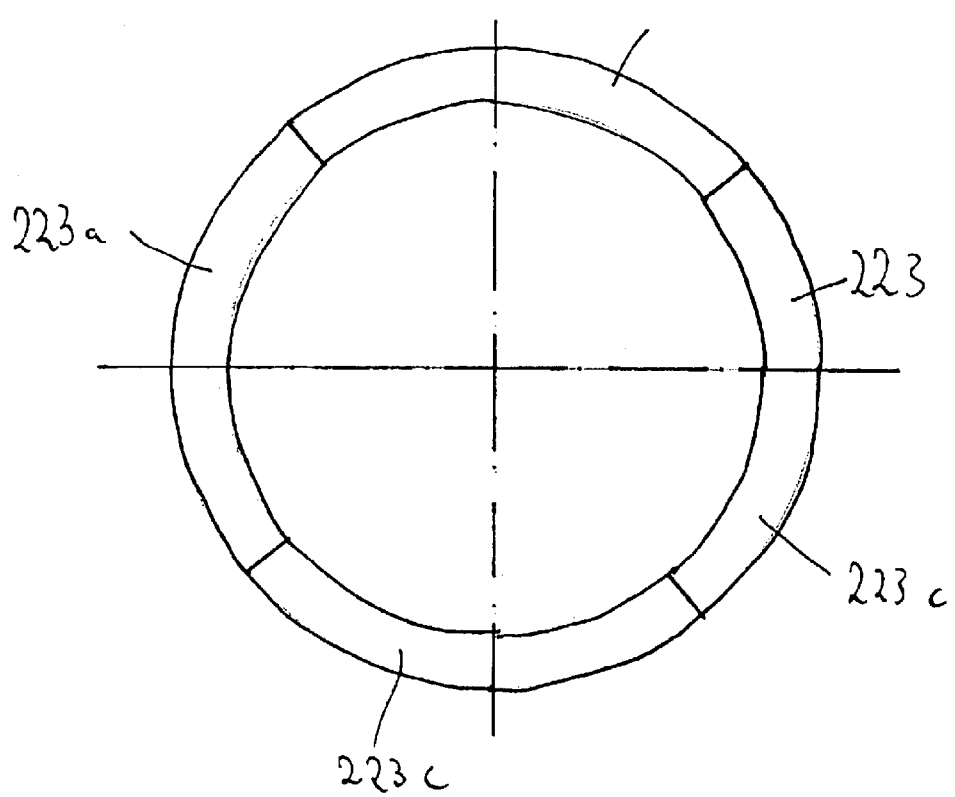
FIG. 5b shows a section along the line X—X in FIG. 2a of a multi-piece tilting frame.

The frame 123 in FIG. 5a is a single piece, whereas the frame 223 in FIG. 5a is made up of four equal circular segments 223a, 223b, 223c and 223d. This is only an example of how the multi-piece frame can be constructed. The segments can also be of different sizes and shapes when the region in which the hydraulic cylinder engages or in which the tilting linkage is provided is reinforced.

Figure 4:
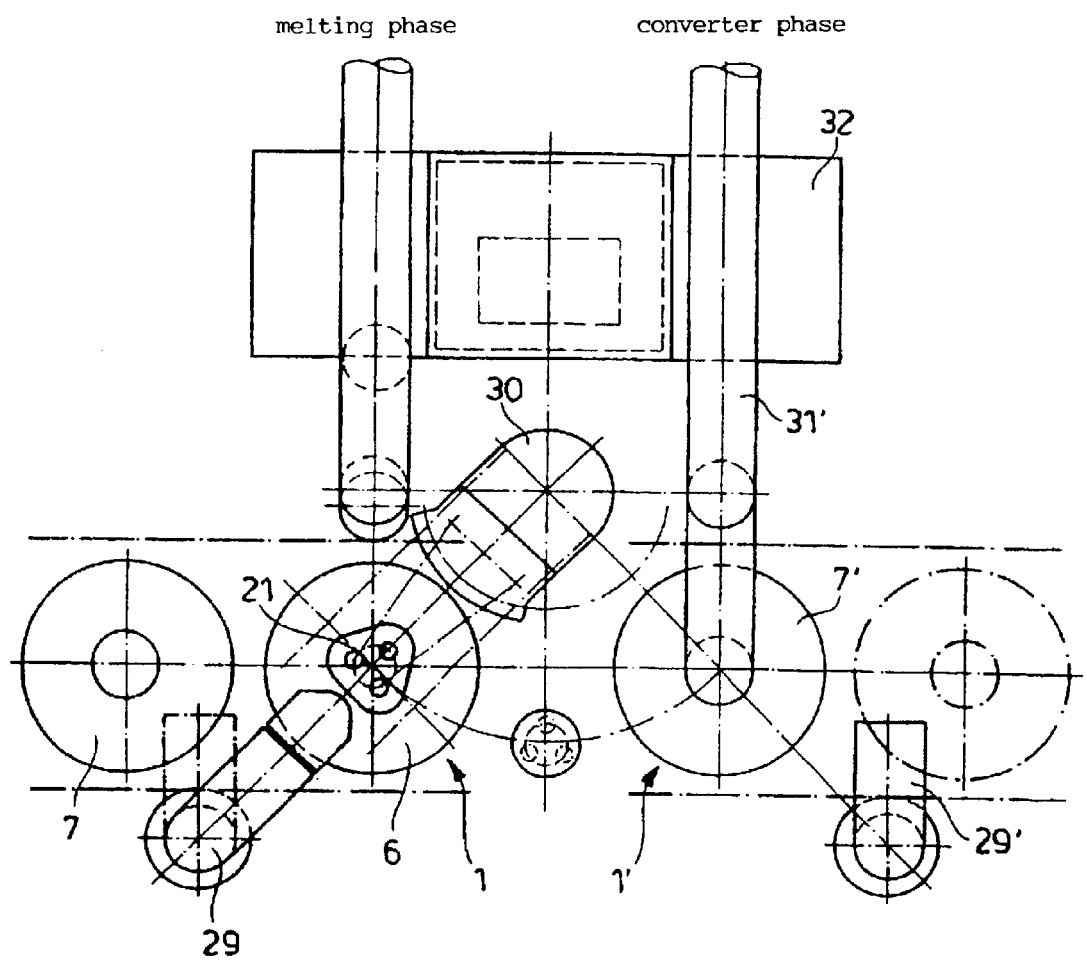
FIG. 4 shows a top view of a twin-furnace system with two systems in accordance with the invention arranged side by side.

FIG. 4 shows a twin-furnace system with two systems of the invention arranged side by side, in which the melting phase is carried out in one of the vessels, while the converter or blowing phase is simultaneously carried out in the other vessel, and vice versa. In the melt-down phase, the first vessel 1 is charged with the necessary burden and then closed with the furnace roof 6. During the melt-down phase, the furnace roof 6 is connected with a swiveling waste gas manifold 29. In this phase, the converter hood 7 assigned to vessel 1 is in its holding position. The swiveling heating equipment 30 swings three graphite electrodes 21 over the opening in the furnace roof 6 of the vessel in which the melting phase is beginning and lowers them into the vessel. Meanwhile, the second vessel 1' is covered with the converter hood 7' and is connected to a dust separator 32 by a second waste gas line 31', which can be swiveled over the converter hood. The waste gas manifold 29' is in its holding position. After the melting and oxidizing operations, e.g., in the case of chromium steels, the melt, together with the slag, is tapped by the bottom tapping system into a steel pouring ladle along with more alloying additions. The chromium-containing slag is then taken off at a stationary deslagging station, and the molten steel is conveyed to a continuous casting machine.

What is claimed is:

1. System for producing steel, which comprises a vessel (1; 101; 1'), in which the metallic charge is melted, oxidized and refined, with an upper vessel section (5) with at least one opening, through which at least one electrode (21) can be lowered into the vessel, and with a lower vessel section (2) with a vessel bottom (3), and a bottom tapping system (10, 11) with a single opening (10) for tapping both the melt and the slag, the opening (10) of the bottom tapping system in the bottom (3) of the lower vessel section (2) is arranged either centrically or eccentrically to the vertical center axis of the vessel, the lower vessel section (2) having side wall tuyeres (13) through which oxygen and argon can be injected into the melt.

2. System in accordance with claim 1, wherein a tilting system with a single-piece or multiple-piece tilting frame (123; 223), which is located at the level of the vessel bottom (3; 203) and on which the vessel (101; 201) can be set by lowering the bottom of the vessel into it, the tilting system having a tilting motion of less than ±5°.

3. System in accordance with claim 1, wherein the lower vessel section (2) has laterally displaced wall regions (4) above the vessel bottom (3) to form stable bearing surfaces (15) of the vessel, which rest on bearing supports (16), which are mounted on a stationary furnace platform (17), the foundation or the tilting frame (23).

4. System in accordance with claim 2, wherein the lower vessel section (202) has laterally reinforced regions of the vessel bottom to form bearing surfaces (215), which rest on the tilting frame (223).

5. System in accordance with claim 2, wherein the tilting system has at least one tilting element (124; 224), which acts on the frame (123; 223) on one side by a lifting motion, in such a way that the frame and thus the vessel are shifted into a tilting motion, and at least one bearing element (125) for absorbing the tilting motion of the vessel.

6. System in accordance with claim 1, wherein the bottom tapping system comprises a closing element (11), which closes the taphole from the outside at the end of the tapping operation, and a filling mechanism for filling the taphole with a filler material (12).

7. System in accordance with claim 1, wherein a slag-tapping system with a movable slag gate (228) in the side wall of the lower vessel section (202), in which the slag is tapped by tilting the vessel (201) by means of the tilting system.

8. System in accordance with claim 1, wherein heating equipment (30, 31) for swiveling the electrodes (21) through the opening in the upper vessel section, such that the heating equipment is rigidly mounted on a furnace platform (17) or a foundation, and the opening is enlarged relative to the circumference of the electrodes in such a way that the electrodes do not strike the wall of the opening when the vessel is tilted.

9. System in accordance with claim 1, wherein the vessel is installed on the foundation, the furnace platform (17) or the tilting frame (123) either as a fixed vessel that cannot be removed or as an interchangeable vessel that can be removed.

10. System in accordance with claim 1, wherein a vessel, in which the processes of melting (melting phase) and of oxidizing and refining (converter phase) are carried out in succession, such that the vessel (1, 101; 201) comprises the following from bottom to top: the lower vessel section (2, 202) with a vessel bottom (3; 203), a side wall (4) with a bulging design arranged above the lower vessel section, the upper vessel part (5, 205) is arranged above the side wall and includes a swiveling converter hood (7) or a swiveling furnace roof (6), which has a core piece (20) that consists of refractory material and contains the electrode opening, such that the converter hood (7) and the furnace roof (6) alternately cover the vessel, depending on whether the vessel is in the melting phase or the converter phase, and a tuyere blowing system (13) in the lower vessel section for injecting process gases.

11. Twin-furnace system with two systems in accordance with claim 10, which are installed adjacent to each other and alternately operated in the melting phase or converter phase.

* * * * *